J. W. CLARK.
Nursery Planter and Manurer.
No. 62,006.  Patented Feb. 12, 1867.
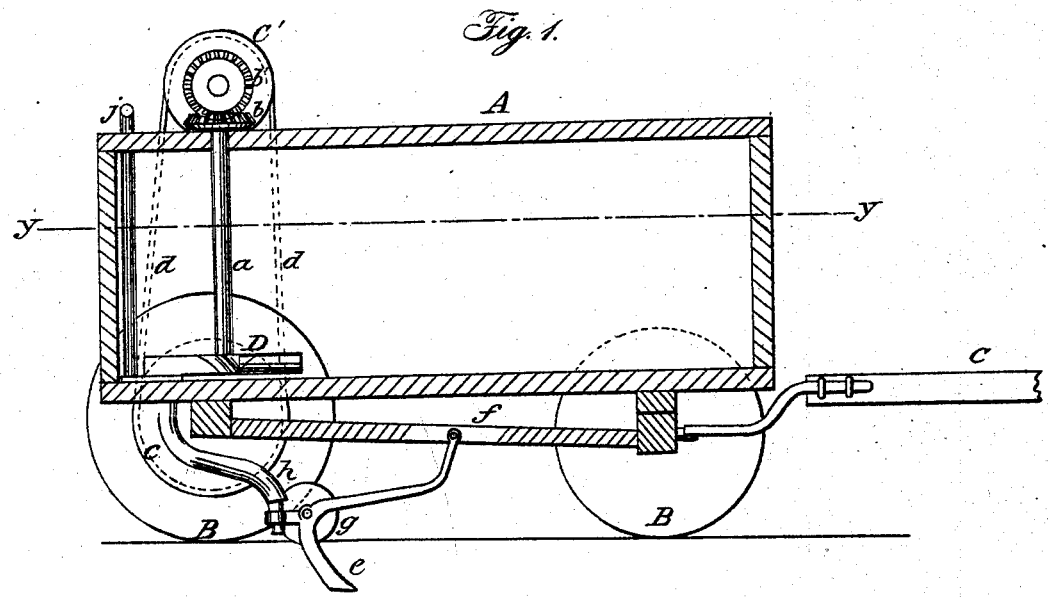
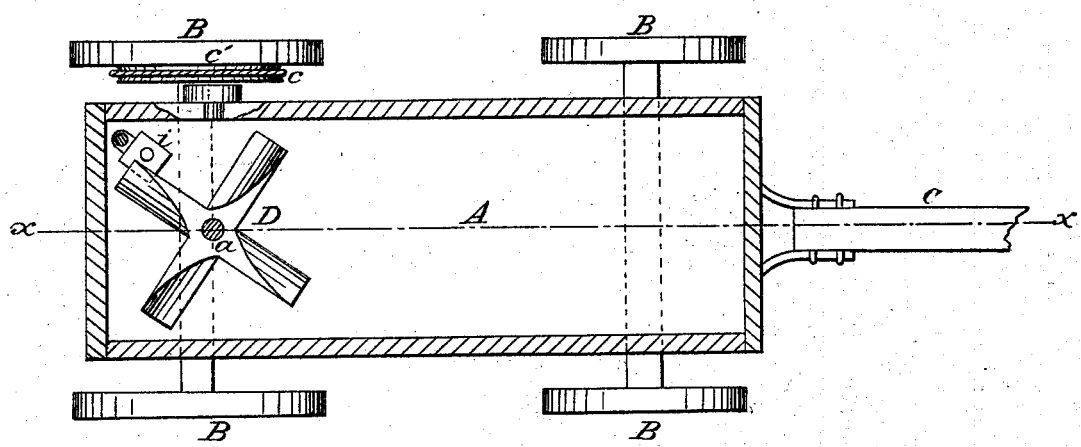
Witnesses:
F. A. Jackson.
Chas A Scott.
Inventor:
J. W. Clark
Per Munn & Co.
Attorneys.

United States Patent Office

J. WARREN CLARK, OF IOWA CITY, IOWA.

Letters Patent No. 62,006, dated February 12, 1867.

---

IMPROVEMENT IN APPARATUS FOR DISTRIBUTING LIQUID MANURE.

---

The Schedule referred to in these Letters Patent and making part of the same.

---

TO ALL WHOM IT MAY CONCERN:

Be it known that I, J. WARREN CLARK, of Iowa City, in the county of Johnson, and State of Iowa, have invented a new and improved Nursery Planter; and I do hereby declare that the following is a full, clear, and exact description thereof, which will enable others skilled in the art to make and use the same, reference being had to the accompanying drawings, forming part of this specification, in which—

Figure 1 is a vertical longitudinal section, in the plane of the line $x\ x$, fig. 2, showing the interior arrangement of my invention.

Figure 2 is a horizontal longitudinal section, in the plane of the line $y\ y$, fig. 1, showing the same in plan view.

Similar letters of reference indicate like parts.

This invention relates to the planting of hedges, or any small plants, in rows, as practised by nurserymen or horticulturists. It consists in providing a box wagon, made tight to hold water mixed with earthy matter or compost, forming such a puddling compound as is usually applied to young plants and trees when set out, to insure their vitality and growth, having connected with it an apparatus for running a narrow furrow or trench in the earth, and conducting the fertilizing compound directly into said trench behind the plough or coulter employed for opening it. The ordinary method of planting is to make holes in the earth with a dibble, and pour into them the fertilizing compound when the plants are set; but this is a slow and laborious operation, and the work is greatly expedited and facilitated by means of the apparatus herein described.

A represents a close, water-tight wagon box, mounted on wheels, B B, with a draught-pole, C, attached in front. In the rear part of the inside of the box is placed a horizontal spider or mixer, D, hung at the lower end of a vertical spindle, $a$, which is connected with and operated by one of the hind driving wheels B, through the bevel gearing $b\ b'$ and the pulleys $c\ c'$, over which passes the driving-band $d\ d$, or by any other suitable gearing to give the mixer D rotary motion by means of the wagon-wheel or wheels. Under the wagon, a coulter-plough, $e$, is suspended to the wagon-reach $f$, and so arranged in connection with a pair of caster-wheels, $g$, which run upon the surface of the ground as the wagon moves, that the plough shall penetrate the soil six or eight inches, or any requisite depth, and cut a proper furrow or trench for setting young trees or plants. A flexible pipe or hose, $h$, runs from the bottom of the wagon, and is fastened at the lower end immediately behind the plough $e$, for conducting the puddling compound of water and earthy matter into the furrow or trench as it is opened by the plough. A slide-valve, $i$, is placed over the hole in the bottom of the wagon box, for regulating the supply of puddling compound, operated by a crank, $j$, or any other suitable device. As the box wagon is moved forward by a team over the field to be planted, the plough $e$ cuts the requisite furrow, and the pipe $h$ conveys the puddling compound from the wagon box directly into it. While the "puddling" is fresh and soft the young trees or plants are easily and rapidly set in it by hand, thus greatly facilitating the operation of planting hedges or nursery trees.

Having thus described the nature and operation of my invention, what I claim as new, and desire to secure by Letters Patent, is—

The combination of a box wagon, for containing water and earth, forming a puddling compound, with a plough for cutting a trench, connected with a mixer of the compound within the wagon box, and a hose or its equivalent for conducting it into the trench behind the plough, for the purpose of setting young trees or plants in rows, constructed and arranged substantially as herein described.

J. WARREN CLARK.

Witnesses:
A. BENJ. CORNELL,
T. G. BAKER.